US007641961B2

(12) United States Patent  (10) Patent No.: US 7,641,961 B2
Sen et al.  (45) Date of Patent: Jan. 5, 2010

(54) INK SOLVENT ASSISTED HEAT SEALABLE MEDIA

(75) Inventors: Radha Sen, San Diego, CA (US); Juan M. Salazar, El Cajon, CA (US); Jayprakash C. Bhatt, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 795 days.

(21) Appl. No.: 11/054,127

(22) Filed: Feb. 8, 2005

(65) Prior Publication Data

US 2006/0083872 A1 Apr. 20, 2006

Related U.S. Application Data

(60) Provisional application No. 60/620,959, filed on Oct. 20, 2004.

(51) Int. Cl.
*B41M 5/00* (2006.01)
*B44C 1/17* (2006.01)
*G03G 7/00* (2006.01)

(52) U.S. Cl. .............. 428/195.1; 428/32.1; 428/32.28; 428/32.34; 106/31.58; 106/31.86; 347/88; 347/95; 347/96; 347/98; 347/99; 347/100; 347/101; 347/105; 347/106

(58) Field of Classification Search ............... 428/32.1, 428/32.28, 32.34, 195.1; 106/31.58, 31.86; 347/88, 95, 96, 98, 99, 100, 101, 105, 106
See application file for complete search history.

(56) References Cited

U.S. PATENT DOCUMENTS

| 3,529,129 A | 9/1970 | Rees |
| 3,886,080 A | 5/1975 | Schucker et al. |
| 4,162,997 A | 7/1979 | Walsh |
| 4,402,262 A | 9/1983 | Handforth |
| 4,495,229 A | 1/1985 | Wolf et al. |
| 4,500,895 A | 2/1985 | Buck et al. |
| 4,513,298 A | 4/1985 | Scheu |
| 4,593,064 A | 6/1986 | Hosch |
| 4,714,769 A | 12/1987 | De Antoniis et al. |
| 4,794,409 A | 12/1988 | Cowger et al. |
| 4,943,375 A | 7/1990 | Bradshaw et al. |
| 4,946,557 A | 8/1990 | Svending |
| 5,133,820 A | 7/1992 | Katayama et al. |
| 5,179,213 A | 1/1993 | Bradshaw et al. |
| 5,224,972 A | 7/1993 | Frye et al. |
| 5,249,062 A | 9/1993 | Ejiri et al. |
| 5,264,275 A | 11/1993 | Misuda et al. |
| 5,275,876 A | 1/1994 | Misuda et al. |
| 5,368,833 A | 11/1994 | Johansson et al. |
| 5,393,892 A | 2/1995 | Krakowiak et al. |
| 5,411,787 A | 5/1995 | Kulkarni et al. |
| 5,463,178 A | 10/1995 | Suzuki et al. |
| 5,537,137 A | 7/1996 | Held et al. |
| 5,547,760 A | 8/1996 | Tarbet et al. |
| 5,549,740 A | 8/1996 | Takahashi et al. |
| 5,554,739 A | 9/1996 | Belmont |
| 5,560,770 A * | 10/1996 | Yatake ............... 106/31.43 |
| 5,576,088 A * | 11/1996 | Ogawa et al. ............. 428/32.33 |
| 5,596,027 A | 1/1997 | Mead et al. |
| 5,607,482 A | 3/1997 | Reiff et al. |
| 5,640,187 A | 6/1997 | Kashiwazaki et al. |
| 5,643,414 A | 7/1997 | Johanson et al. |
| 5,698,017 A | 12/1997 | Sacripante et al. |
| 5,702,610 A | 12/1997 | Hagen et al. |
| 5,702,804 A | 12/1997 | Malhotra |
| 5,707,493 A | 1/1998 | Saastamoinen |
| 5,746,818 A | 5/1998 | Yatake |
| 5,792,249 A | 8/1998 | Shirota et al. |
| 5,804,293 A | 9/1998 | Nehmsmann et al. |
| 5,814,685 A | 9/1998 | Satake et al. |
| 5,817,169 A | 10/1998 | Sacripante et al. |
| 5,831,655 A | 11/1998 | Asawa et al. |
| 5,846,306 A | 12/1998 | Kubota et al. |
| 5,849,837 A | 12/1998 | Wei et al. |
| 5,851,273 A * | 12/1998 | Morris et al. ............. 106/31.27 |
| 5,854,307 A | 12/1998 | Kimura et al. |

(Continued)

FOREIGN PATENT DOCUMENTS

EP    0606490    2/1993

(Continued)

*Primary Examiner*—Bruce H Hess
*Assistant Examiner*—David J Joy

(57) ABSTRACT

A method of producing a print medium to reduce problems associated with the gradual dye-fade and color-shift of inks over time, and to provide improved resistance to physical handling is provided Specifically, a method can comprise steps of coating a media substrate with a porous coating composition of semi-metal oxide or metal oxide particulates to form a porous ink receiving layer, coating the porous ink-receiving layer with a latex layer configured to allow an ink-jet ink to be received at the porous ink-receiving layer, printing ink-jet ink on at least a portion of the latex layer to form ink-associated latex regions exclusive of non-printed latex regions, and heating the latex layer. The ink-jet ink can include an ink vehicle, a colorant, and a film promoting additive that lowers the film forming temperature of the latex particulates in the ink-associated latex regions. Upon heating, the ink-associated latex regions form a continuous film, and non-printed latex regions do not form a continuous film. Associated systems and ink-jet prints are also provided.

40 Claims, No Drawings

U.S. PATENT DOCUMENTS

| | | | |
|---|---|---|---|
| 5,854,331 A | 12/1998 | Ma et al. | |
| 5,858,280 A | 1/1999 | Zhang et al. | |
| 5,889,083 A | 3/1999 | Zhu | |
| 5,892,037 A | 4/1999 | Steinmann | |
| 5,912,280 A | 6/1999 | Anton et al. | |
| 5,922,118 A | 7/1999 | Johnson et al. | |
| 5,936,008 A | 8/1999 | Jones et al. | |
| 5,965,244 A | 10/1999 | Tang et al. | |
| 5,985,425 A | 11/1999 | Tomizawa et al. | |
| 5,990,202 A | 11/1999 | Nguyen et al. | |
| 6,027,210 A | 2/2000 | Kurabayashi et al. | |
| 6,057,384 A | 5/2000 | Nguyen et al. | |
| 6,080,229 A | 6/2000 | Watanabe et al. | |
| 6,103,380 A | 8/2000 | Devonport | |
| 6,110,601 A | 8/2000 | Shaw-Klein et al. | |
| 6,126,280 A | 10/2000 | Hashimoto et al. | |
| 6,140,390 A | 10/2000 | Bugner et al. | |
| 6,147,139 A | 11/2000 | Shaw-Klein et al. | |
| 6,183,844 B1 | 2/2001 | Li | |
| 6,204,307 B1 | 3/2001 | Miyabayashi | |
| 6,228,475 B1 | 5/2001 | Chu et al. | |
| 6,245,832 B1 * | 6/2001 | Suzuki et al. | 523/160 |
| 6,248,161 B1 | 6/2001 | Nguyen et al. | |
| 6,248,805 B1 | 6/2001 | Nguyen et al. | |
| 6,265,483 B1 | 7/2001 | Guilard et al. | |
| 6,276,792 B1 | 8/2001 | Gundlach et al. | |
| 6,281,269 B1 | 8/2001 | Schut | |
| 6,337,358 B1 | 1/2002 | Whitehouse et al. | |
| 6,350,519 B1 | 2/2002 | Devonport | |
| 6,383,278 B1 | 5/2002 | Hirasa et al. | |
| 6,406,143 B1 | 6/2002 | Chen et al. | |
| 6,409,330 B1 * | 6/2002 | Nakamura et al. | 347/103 |
| 6,417,248 B1 | 7/2002 | Gore | |
| 6,417,249 B1 | 7/2002 | Nguyen et al. | |
| 6,420,039 B1 | 7/2002 | Field et al. | |
| 6,428,148 B1 | 8/2002 | Gore | |
| 6,439,708 B1 | 8/2002 | Kato et al. | |
| 6,447,881 B1 | 9/2002 | Nishida et al. | |
| 6,450,632 B1 | 9/2002 | Tsang et al. | |
| 6,458,876 B1 | 10/2002 | Rabasco et al. | |
| 6,460,989 B1 | 10/2002 | Yano et al. | |
| 6,565,770 B1 | 5/2003 | Mayer et al. | |
| 6,652,085 B2 | 11/2003 | Tsao | |
| 6,670,002 B1 | 12/2003 | Sekiguchi et al. | |
| 6,685,770 B2 | 2/2004 | Adachi et al. | |
| 2002/0077386 A1 | 6/2002 | Kurabayashi et al. | |
| 2002/0144626 A1 | 10/2002 | Schut | |
| 2003/0029355 A1 * | 2/2003 | Miyabayashi | 106/31.27 |
| 2003/0069329 A1 | 4/2003 | Kubota et al. | |
| 2003/0219539 A1 | 11/2003 | Nigam | |
| 2004/0017454 A1 | 1/2004 | Yoshizawa et al. | |
| 2004/0046848 A1 | 3/2004 | Payne et al. | |
| 2004/0071900 A1 | 4/2004 | Ray et al. | |
| 2005/0287312 A1 * | 12/2005 | Bhatt | 428/32.34 |

FOREIGN PATENT DOCUMENTS

| | | |
|---|---|---|
| EP | 0696516 | 2/1996 |
| EP | 0716929 | 5/1996 |
| EP | 0 904 953 A | 3/1999 |
| EP | 0937582 | 8/1999 |
| EP | 1041126 | 10/2000 |
| EP | 1 407 893 A | 4/2004 |
| EP | 1 502 759 A | 2/2005 |
| JP | H11-157207 | 9/1998 |
| JP | 2002-172855 | 7/2002 |
| JP | 2003-048366 | 2/2003 |
| JP | 2004-181909 | 7/2004 |
| JP | 2004-188704 | 7/2004 |
| WO | WO97/20216 | 6/1997 |

* cited by examiner

INK SOLVENT ASSISTED HEAT SEALABLE MEDIA

CLAIM OF PRIORITY

This application claims the benefit of U.S. Provisional Patent Application No. 60/620,959, filed on Oct. 20, 2004, which is incorporated by reference herein in its entirety.

FIELD OF THE INVENTION

The present invention relates generally to ink-jet media and methods for protecting printed images. More particularly, the present invention relates to preparing an ink-receiving layer with a latex coated thereon, and an ink containing a film promoting additive that assists the latex in forming a film upon heating.

BACKGROUND OF THE INVENTION

In ink-jet technology, image quality of high-resolution images can be a function of both the ink-jet ink used to produce an image, and the print medium upon which the image is printed. Desirable attributes of print quality include saturated colors, high gloss and gloss uniformity, and freedom of grain and coalescence, among other characteristics.

Once a high-resolution image is printed, however, another major issue arises, namely, image permanence relating to how long the quality of the image will last. As the photo industry continues to move from film to digital image methods, the issue of image permanence becomes much more important.

With respect to much of the print media currently on the market, printed images commonly have undesirable attributes in the area of image permanence. One such undesirable attribute is the gradual dye-fade observed when dye-based ink-jet inks are printed on porous media. Such fade has been shown to be caused by small amounts of reactive compounds in the air, such as ozone. It appears that, over time, ozone reacts with many dyes commonly used in ink-jet inks, thus causing them to break down and to lose or diminish their intended color properties. It should be noted that dye-fade is more of a problem with certain dyes than with others. For example, cyan dyes tend to be affected to a greater extent by the presence of ozone in the air than do some other dyes.

Along with dye-fade, another significant undesirable attribute is color-shift. It has been observed that when ozone reacts with ink-jet ink dyes, the intended color properties of a given dye may shift to another wavelength value along the visible spectrum. This effect causes a gradual change in the perceived colors of the printed image from what was originally intended by the dyes.

These undesirable attributes, namely dye-fade, color-shift, and damage as a result of physical handling, gradually affect the perception of the printed image. Because the printed image is susceptible to these significant changes over time, many have been reluctant, especially in the graphics arts and photography industries, to embrace ink-jet printing of images intended to last a significant period of time.

As such, it would be beneficial to develop print media that provided for a more physically durable printed image with increased ozone fastness and reduced color-shift.

SUMMARY OF THE INVENTION

It has been recognized that it would be advantageous to develop a print medium that reduces undesirable attributes related to image permanence, such as dye-fade and color-shift, and provides improved resistance to physical handling. In accordance with this recognition, a method of producing a printed image can comprise steps of coating a media substrate with a porous coating composition of semi-metal oxide or metal oxide particulates to form a porous ink receiving layer, coating the porous ink-receiving layer with a latex layer configured to allow an ink-jet ink to be received at the porous ink-receiving layer, printing ink-jet ink on at least a portion of the latex layer to form ink-associated latex regions exclusive of non-printed latex regions, and heating the latex layer. The ink-jet ink can include an ink vehicle, a colorant, and a film promoting additive that lowers the film forming temperature of the latex particulates in the ink-associated latex regions. Upon heating, the ink-associated latex regions form a continuous film, and non-printed latex regions do not form a continuous film.

In accordance with an alternative detailed aspect of the present invention, a printed image on a print medium exhibiting increased water fastness and image permanence can include a media substrate, a porous ink-receiving layer of semi-metal oxide or metal oxide particulates coated on the media substrate, a latex layer coated on the porous ink-receiving layer, and an ink-jet ink comprising a film promoting additive printed on at least a portion of the latex layer forming ink-associated regions of the latex layer exclusive of non-printed latex regions. The ink-jet ink can be received at least partially by the porous ink-receiving layer, and at least a portion of the ink-associated regions of the latex layer include a continuous film and the non-printed latex regions of the latex layer do not include a continuous film.

In another embodiment, a system for producing a printed image can comprise an ink-jet ink, a print medium, and a heating device. The ink-jet ink can include an ink vehicle, a colorant, and a film promoting additive, wherein the film promoting additive is configured to lower the film forming temperature of latex particulates upon contact therewith. The print medium can include a media substrate, an ink receiving layer including semi-metal oxide or metal oxide particulates coated on the media substrate, and a discontinuous latex layer coated on the ink-receiving layer, wherein the latex layer is configured to allow the ink-jet ink to pass therethrough and be received at the porous ink-receiving layer. The heating device can be configured to apply heat to the print medium after the ink-jet ink has been applied to form ink-associated latex regions, wherein the ink-associated latex regions form a continuous film upon application of the heat, and wherein regions that the ink-jet ink has not been applied do not form a continuous film upon application of the heat.

Additional features and advantages of the invention will be apparent from the following detailed description which illustrates, by way of example, features of the invention.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a dye" includes reference to one or more of such materials.

An "ink" or "ink-jet ink" refers to a liquid solution or dispersion composition that can comprise a liquid vehicle and a colorant, e.g., a dye. The liquid vehicle can be configured to be stable with the dye through a broad range of solution characteristics, and can be configured for ink-jet printing.

As used herein, "liquid vehicle" is defined to include liquid compositions that can be used to carry colorants to a substrate. Liquid vehicles are well known in the art, and a wide variety of ink vehicles may be used in accordance with embodiments of the present invention. Such ink vehicles may include a mixture of a variety of different agents, including without limitation, surfactants, solvents, cosolvents, buffers, biocides, viscosity modifiers, sequestering agents, stabilizing agents, and water. The liquid vehicle can also carry other additives such as polymers, UV curable materials, and/or plasticizers in some embodiments.

"Media substrate" or "substrate" includes any substrate that can be coated with a coating composition (to form an ink-receiving layer) of the present invention, and can include papers, overhead projector plastics or films, coated papers such as photobase, fabric, art paper such as water color paper, or the like.

The term "print medium" or "print media" refers to a media substrate that is coated with an ink-receiving layer.

"Porous media" refers to any substantially inorganic particulate-containing coated media having surface voids and/or cavities capable of taking in the ink-jet inks in accordance with embodiments of the present invention. Typically, porous media includes a substrate and a porous ink-receiving layer. As ink is printed on the porous media, the ink can fill the voids and the outermost surface can become dry to the touch in a more expedited manner as compared to traditional or swellable media. Common inorganic particulates that can be present in the coatings include semi-metal oxide or metal oxide particulate such as silica or alumina, for example. Additionally, such coatings are typically bound together by a polymeric binder, and optionally, can include mordants or ionic binding species that are attractive of classes of predetermined dye species.

The term "latex" or "latex dispersion" includes both latex particulates as well as the aqueous medium in which the latex particulates are dispersed. More specifically, a latex is a liquid suspension comprising a liquid (such as water and/or other liquids) and polymeric particulates from 20 nm to 500 nm (preferably from 100 nm to 300 nm) in size, and having a weight average molecular weight from about 10,000 Mw to 2,000,000 Mw (preferably from about 40,000 Mw to 100,000 Mw). Typically, the polymeric particulate can be present in the liquid at from 0.5 wt % to 15 wt %. Such polymeric particulates can comprise a plurality of monomers that are typically randomly polymerized, and can also be crosslinked. When crosslinked, the molecular weight can be even higher than that cited above. Additionally, in one embodiment, the latex component can have a glass transition temperature from about −25° C. to 100° C.

The term "latex particulates" or "latex particles" are the polymeric masses that are dispersed in a latex dispersion. In one embodiment, the latex particulates can be substantially nonporous.

The term "glass transition temperature" refers to the temperature at which the properties of a polymer change from a rigid state to a more pliable state. In other words, a polymer is in a rigid state when the temperature is below the glass transition temperature for that polymer, and is in a pliable or flowable state when above the glass transition temperature. When heated above the glass transition temperature, latex particulates can begin to flow together to form a continuous film.

The term "film forming temperature" refers to the temperature at which latex particulates flow together and coalesce to form a continuous film. The degree of coalescence can also be affected by pressure applied concurrent with heat and the duration that the heat is applied.

The term "continuous film" refers to a latex layer that has been heated to at least the film forming temperature for that latex, and wherein the latex particulates comprising the layer have flowed together to form a continuous film barrier. A continuous layer can impede the passage of ozone and other gasses and particulates from the air to the ink. The integrity of a continuous layer may be tested by utilizing a highlighter test. In this test, a highlighter is drawn across the printed image to be tested. If the layer of latex is continuous, the highlighter dye is prevented from passing through to the ink-receiving layer, and thus is easily rubbed off of the printed image. If the layer of latex is not continuous, the highlighter dye will pass though to the ink-receiving layer and thus will not rub off.

The term "discontinuous film," "discontinuous latex layer," or the like, refers to a particulate layer that comprises a matrix-like structure of particulates interspersed with voids. The voids are distributed throughout the layer, and are of such a size as to allow the passage of a fluid. An example of such a discontinuous film results from the application of a latex to a substrate at below the glass transition temperature for that latex. This layer has not been heated to form a continuous film, and thus comprises a matrix of latex particulates with interspersed voids. The average size of the voids can be from about 5 nm to about 25 nm, though these values may be highly variable. Because the latex has not formed a continuous film, ink is allowed to pass through the inter-particulate voids upon application. It should be noted that the heat applied does not have to be below the glass transition temperature, but that the combination of heat, time, and pressure, etc., should not raise the latex particulates above its glass transition temperature. To illustrate, the application of higher temperatures for short periods of time will not necessarily raise the temperature of the material to above its glass transition temperature, even if the higher temperature applied is greater than the glass transition temperature.

The term "about" when referring to a numerical value or range is intended to encompass the values resulting from experimental error that can occur when taking measurements.

Concentrations, amounts, measurements, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

In accordance with various embodiments of the present invention, a method is disclosed for producing a printed image that results in a reduction of dye-fade and/or color-shift over time, and can provide improved durability to physical handling. The method can include a step of coating a media substrate with a porous coating composition, containing semi-metal oxide or metal oxide particulates, to form a porous ink-receiving layer. The method can also include a step of coating the porous ink-receiving layer with a latex layer including latex particulates. The latex layer can be configured to allow an ink-jet ink to be received at the porous ink-receiving layer. In other words, the latex layer is applied such that the latex particulates form a discontinuous layer. In one embodiment, optional binder can be present to further bind the latex layer to the ink-receiving layer.

The method can also include a step of printing ink-jet ink on at least a portion of the latex layer, such that at least a portion of the ink-jet ink is received by the ink-receiving layer, and wherein the printing forms ink-associated latex regions exclusive of non-printed latex regions. An ink-associated region is defined as the area of the latex layer where the latex particulates are in contact with the ink-jet ink. Non-printed latex regions are those areas of the latex layer where the latex particulates are not in contact with the ink-jet ink. The ink-jet ink may include an ink vehicle, a colorant, and a film promoting additive. The film promoting additive can lower the film forming temperature of the latex particulates in the ink-associated latex regions.

The method can also include a step of heating the latex layer such that the ink-associated latex regions form a continuous film, and non-printed latex regions do not form a continuous film. The actual formation of a latex film is dependent on the temperature applied to the latex layer and the duration that the latex layer is at that temperature. Also, pressure applied to the latex layer during heating can accelerate the film forming process.

The resulting printed image includes a continuous latex film over printed areas and at least a partially discontinuous film over non-printed areas. In other words, the permanence of the printed image is improved because those areas containing ink in the ink-receiving layer become protected by a continuous latex film, thus reducing dye-fade and/or color shift by providing a barrier between the ink and reactive compounds in the air. The areas of discontinuous film do not affect the permanence of the printed image, because the ink-receiving layer beneath these areas does not contain ink. Also, because the ink-associated regions have a lowered film forming temperature, the heating requirements to seal the printed image are less, thus reducing the time to seal a printed image. Further, in one embodiment, unprinted areas can be subsequently printed on after sealing the ink-associated regions, as the discontinuous film of the non-printed areas is still present. In any event, the continuous nature of the film can be verified utilizing the highlighter test, as previously described.

Another embodiment of the present invention provides a printed image on a print medium that can exhibit reduced dye-fade and/or color-shift over time, and improved durability to physical handling. The printed image can comprise a porous ink-receiving layer coated on a media substrate. The porous ink-receiving layer can include semi-metal oxide or metal oxide particulates. The printed image can also include a latex layer coated on the porous ink-receiving layer. In one embodiment, optional binder can be present to further bind the latex layer to the ink-receiving layer.

The printed image can also include an ink-jet ink comprising a film promoting additive printed on at least a portion of the latex layer, and at least partially received by the ink-receiving layer. The printed portions of the latex layer form ink-associated regions which are exclusive of non-printed latex regions. At least a portion of the latex layer of the ink-associated regions can include a continuous film, and the non-printed latex regions can include portions of the latex layer that do not include a continuous film.

A system for producing a printed image is also disclosed, and can comprise an ink-jet ink, a print medium, and a heating device. The ink-jet ink can include an ink vehicle, a colorant, and a film promoting additive, wherein the film promoting additive is configured to lower the film forming temperature of latex particulates upon contact therewith. The print medium can include a media substrate, an ink receiving layer including semi-metal oxide or metal oxide particulates coated on the media substrate, and a discontinuous latex layer coated on the ink-receiving layer. The latex layer can be configured to allow the ink-jet ink to pass therethrough and be received at the porous ink-receiving layer. The heating device can be configured to apply heat to the print medium after the ink-jet ink has been applied to form ink-associated latex regions, wherein the ink-associated latex regions form a continuous film upon application of the heat, and wherein regions that the ink-jet ink has not been applied do not form a continuous film upon application of the heat.

Porous Media Coatings

In accordance with one aspect of the present invention, methods, coated print media and ink-jet ink systems, and printed images are provided. The coated print media in each of these embodiments typically includes a substrate and a porous ink-receiving layer deposited on the substrate. The substrate can be paper, plastic, coated paper, fabric, art paper, or other known substrate used in the ink-jet printing arts. In one embodiment, photobase can be used as the substrate. Photobase is typically a three-layered system comprising a single layer of paper sandwiched by two polymeric layers, such as polyethylene layers.

With respect to the porous ink-receiving layer, inorganic semi-metal oxide or metal oxide particulates, a polymeric binder, and optionally, mordants and/or other porous coating composition agents can be present. In one embodiment, the inorganic semi-metal oxide or metal oxide particulates can be silica, alumina, boehmite, silicates (such as aluminum silicate, magnesium silicate, and the like), titania, zirconia, calcium carbonate, clays, and combinations thereof. In a more detailed aspect, the particulates can be alumina, silica, or aluminosilicate. Each of these inorganic particulates can be dispersed throughout a porous coating composition, which can be applied to a media substrate to form the porous ink-receiving layer. Typically, the inorganic particulates are present in the coating composition at from 60 wt % to 95 wt %. In a few specific embodiments, boehmite can be present in the coating composition at from 85 wt % to 95 wt %, or silica or silicates can be present in the coating composition at from 75 wt % to 85 wt %.

In order to bind the inorganic particulates together in the coating composition, a polymeric binder is typically included. Exemplary polymeric binders that can be used include polyvinyl alcohol including water-soluble copolymers thereof; polyvinyl acetate; polyvinyl pyrrolidone; modified starches including oxidized and etherified starches; water soluble cellulose derivatives including carboxymethyl cellulose, hydroxyethyl cellulose; polyacrylamide including its derivatives and copolymers; casein; gelatin; soybean protein; silyl-modified polyvinyl alcohol; conjugated diene copolymer latexes including maleic anhydride resin, styrene-butadiene copolymer, and the like; acrylic polymer latexes including polymers and copolymers of acrylic and methacrylic acids, and the like; vinyl polymer latexes including ethylene-vinyl acetate copolymers; functional group-modified latexes including those obtained by modifying the above-mentioned polymers with monomers containing functional groups (e.g.

carboxyl, amino, amido, sulfo, etc.); aqueous binders of thermosetting resins including melamine resins, urea resin, and the like; synthetic resin binders including polymethyl methacrylate, polyurethane resin, polyester resin, amide resin, vinyl chloride-vinyl acetate copolymer, polyvinyl butyral, and alkyl resins. Such binder can be present to bind the porous ink-receiving layer together, but can also be present in small enough amounts to maintain the porous nature of the porous ink-receiving layer. In accordance with embodiments of the present invention, the polymeric binder can be present in the coating composition at from 5 wt % to 40 wt %. In specific embodiments where boehmite is used, the polymeric binder can be present at from 3 wt % to 15 wt %. Alternatively, where silica or silicates are used, the polymeric binder can be present at from 10 wt % to 25 wt %. In another specific embodiment, the binder can be polyvinyl alcohol or derivatives thereof.

Optionally, the porous ink-receiving layer can also be modified with an ionic binding species or mordant known to interact with a predetermined class of colorants, thereby increasing permanence. Typical mordants that can be included in the coating composition (and thus, included in the porous ink-receiving layer) include hydrophilic, water dispersible, or water soluble polymers having cationic groups (amino, tertiary amino, amidoamino, pyridine, imine, and the like). These cationically modified polymers can be compatible with water-soluble or water dispersible binders and have little or no adverse effect on image processing or colors present in the image. Suitable examples of such polymers include, but are not limited to, polyquaternary ammonium salts, cationic polyamines, polyamidins, cationic acrylic copolymers, guanidine-formaldehyde polymers, polydimethyl diallylammonium chloride, diacetone acrylamide-dimethyldiallyl ammonium chloride, polyethyleneimine, and a polyethyleneimine adduct with epichlorhydrin. Aside from mordants, other optional components that can be present in the porous ink-receiving layer can include anionic surfactants, cationic surfactants, biocides, plasticizers, optical brighteners, viscosity modifiers, leveling agents, UV absorbers, hindered amine stabilizers, anti-ozonants, silane coupling agents, and/or other known additives.

The ink-receiving layer can be a single layer or a multilayer coating designed to absorb sufficient quantities of ink to produce high quality printed images. The coating composition may be applied to the media substrate to form the ink-receiving layer by any means known to one skilled in the art, including blade coating, air knife coating, rod coating, wire rod coating, roll coating, slot coating, slide hopper coating, gravure, curtain, and cascade coating. The ink-receiving layer can be printed on one or both sides of the media substrate. In one embodiment of the present invention, the depth of the ink-receiving layer formed by the coating composition can be from about 20 µm to about 60 µm. In accordance with a few specific embodiments, the thickness for boehmite-containing coating compositions can be from 40 µm to 55 µm, the thickness for silica- or silicate-containing coating compositions can be from 25 µm to 35 µm. If applied as a media topcoat, the thickness can range from 0.1 µm to 10 µm, and in a more specific embodiment, from 1 µm to 5 µm.

Latex Layer

The latexes that can be used to form the printed images of the present invention are typically prepared as an aqueous coating composition. The aqueous coating composition can include latex particulates, and optionally a binder. Additional additives to the aqueous coating composition can include spreading agents, plasticizers, and any other additive known to one skilled in the art. The specific formulations for the aqueous coating composition are chosen such that, when applied, a discontinuous film is formed on the resulting print medium. Because of this, ink applied to the print medium can readily pass to the ink-receiving layer through voids of the discontinuous film. The ink is thus held at least partially at the ink-receiving layer.

The latex typically includes a dispersion of latex particulates which can be dispersed polymeric masses. In one embodiment, the latex includes latex particulates having a glass transition temperature from about −25° C. to about 150° C. Theoretically, any latex within this range can be used in embodiments of the present invention. Latexes with glass transition temperatures near or below room temperature, however, may not be as useful because the latex will remain soft and tacky at these temperatures. In a more preferred embodiment of the present invention, any latex can be used having latex particulates with a glass transition temperature from about 50° C. to about 120° C. Useful latexes include, without limitation, acrylic and styrene acrylic latexes. The latexes can also be cationic or nonionic, and can be present in the coating composition from about 80 wt % to about 100 wt %.

The aqueous coating composition can also include a binder. The binder can be any composition or compound known to one skilled in the art that can be used to functionally affix the latex particulates to the porous ink-receptive layer. The binder should be selected such that a discontinuous film, rather than a continuous film, is formed on the porous ink receptive layer, thus maintaining the porosity of the print medium. The physical configuration of the discontinuous layer with respect to the porous ink-receptive layer allows ink applied to the print medium to be received by the ink-receiving layer. A continuous film, on the other hand, would not allow the ink sufficient access to the porous ink-receiving layer.

In an embodiment of the present invention, the binder can be present in the aqueous coating composition at less than about 20 wt %. In another embodiment, the binder can be present at from about 5 wt % to about 15 wt %.

Exemplary binders that can be used include polyvinyl alcohol including water-soluble copolymers thereof; polyvinyl acetate; polyvinyl pyrrolidone; modified starches including oxidized and etherified starches; water soluble cellulose derivatives including carboxymethyl cellulose, hydroxyethyl cellulose; polyacrylamide including its derivatives and copolymers; casein; gelatin; soybean protein; silyl-modified polyvinyl alcohol; conjugated diene copolymer latexes including maleic anhydride resin, styrene-butadiene copolymer, and the like; acrylic polymer latexes including polymers and copolymers of acrylic and methacrylic acids, and the like; vinyl polymer latexes including ethylene-vinyl acetate copolymers; functional group-modified latexes including those obtained by modifying the above-mentioned polymers with monomers containing functional groups (e.g. carboxyl, amino, amido, sulfo, etc.); aqueous binders of thermosetting resins including melamine resins, urea resin, and the like; synthetic resin binders including polymethyl methacrylate, polyurethane resin, polyester resin, amide resin, vinyl chloride-vinyl acetate copolymer, polyvinyl butyral, and alkyl resins.

In one embodiment of the present invention, the latex can function as a binder. In this embodiment, the latex used can be a core-shell latex. The core-shell latex comprises latex particulates with an inner portion, or a core, having a polymer with a first glass transition temperature, and an outer portion, or shell, having a polymer with a second glass transition temperature. The latex polymers are selected such that the first glass transition temperature is higher than the second glass transition temperature. These two glass transition temperatures are configured such that, at the application temperature, the inner portion of the latex particulate is hard or nontacky due to its glass transition temperature being higher than the application temperature, and the outer portion of the latex particulate is soft or tacky due to its glass transition temperature being at or lower than the application temperature. When applied to an ink-receiving layer, the tacky nature of the outer portion of the latex particulates enhances the binding properties of the latex. The hard or non-tacky nature of the inner portion of the latex particulates, however, allows a discontinuous film to form with voids sufficient to allow the ink-jet ink to be received by the ink-receiving layer.

The aqueous coating composition can be applied wet, and as it dries, the latex particulates coat the ink-receiving layer to form the discontinuous film. For the aqueous coating composition to form a discontinuous film, it should be applied to the ink-receiving layer at a temperature below the glass transition temperature of the latex particulates. In the case of the core-shell latex particulates, it should be applied at least below the glass transition temperature of the core. It should be noted that the heat applied does not have to be below the glass transition temperature, but that the combination of heat, time, and pressure, etc., should not raise the material itself to above its glass transition temperature. To illustrate, the application of higher temperatures for short periods of time will not necessarily raise the temperature of the material to above its glass transition temperature, even if the higher temperature applied is greater than the glass transition temperature. In addition to considerations of temperature, pressure, and time of application, it is also contemplated that additives can be included in the aqueous coating composition to inhibit continuous film formation at temperatures above the glass transition temperature of the latex.

The aqueous coating composition can be applied to the ink-receiving layer to form the discontinuous film by any means known to one skilled in the art, including blade coating, air knife coating, rod coating, wire rod coating, roll coating, slot coating, slide hopper coating, gravure, curtain, and cascade coating. The aqueous coating composition can by applied to the ink-receiving layer such that voids are created that are interspersed throughout the resulting discontinuous film with an average size of from about 5 nm to about 25 nm. Additionally, the discontinuous film can be printed on one or both sides of the media substrate. In one embodiment, the aqueous coating composition can be applied such that the resulting discontinuous film has an average thickness from about 0.5 $g/m^2$ to about 10 $g/m^2$. In another embodiment, the discontinuous film can have an average thickness of from about 1 $g/m^2$ to about 5 $g/m^2$.

Ink-jet Ink

The ink-jet ink compositions that can be used to form the printed images of the present invention are typically prepared in an aqueous formulation or liquid vehicle which can include water, colorants, cosolvents, surfactants, buffering agents, biocides, sequestering agents, viscosity modifiers, humectants, binders, and/or other known additives. In one aspect of the present invention, the liquid vehicle can comprise from about 70 wt % to about 99.9 wt % by weight of the ink-jet ink composition. In another aspect, the liquid vehicle can also carry polymeric binders, latex particulates, and/or other solids.

As described, cosolvents can be included in the ink-jet ink compositions of the present invention. Suitable cosolvents for use in the present invention include water soluble organic cosolvents, but are not limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerin, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, cosolvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. Cosolvents can be added to reduce the rate of evaporation of water in the ink-jet to minimize clogging or other properties of the ink such as viscosity, pH, surface tension, optical density, and print quality. The cosolvent concentration can range from about 5 wt % to about 25 wt %, and in one embodiment is from about 10 wt % to about 20 wt %. Multiple cosolvents can also be used, as is known in the art.

Various buffering agents or pH adjusting agents can also be optionally used in the ink-jet ink compositions of the present invention. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; hydrochloric acid; and other basic or acidic components which do not substantially interfere with the bleed control or optical density characteristics of the present invention. If used, buffering agents typically comprise less than about 10 wt % of the ink-jet ink composition.

In another aspect of the present invention, various biocides can be used to inhibit growth of undesirable microorganisms. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the ink-jet ink composition and often from about 0.1 wt % to about 0.25 wt %.

In an additional aspect of the present invention, binders can be included which act to protect the colorants on the substrate. Binders suitable for use in the present invention typically have a molecular weight of from about 500 Mw to about 5,000 Mw. Non-limiting examples include polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof.

If surfactants are used, then typical water-soluble surfactants such as alkyl polyethylene oxides, alkyl phenyl polyethylene oxides, polyethylene oxide (PEO) block copolymers, acetylenic PEO, PEO esters, PEO amines, PEO amides, and dimethicone copolyols can be used. Such surfactants can be present at from 0.01% to about 10% by weight of the ink-jet ink composition.

Colorants included in the ink-jet ink of the printed image embodiment of the present invention can be dyes. With respect to the various ink-jet ink dyes, either a cationic dye or an anionic dye can be used. In one embodiment of the present invention, the anionic dye can be a chromaphore having a pendent anionic group. Though any effective amount of dye can be used, preferably, the anionic dye can be present in the ink composition at from about 0.1 wt % to about 10 wt %. Examples of suitable anionic dyes that can be used include a large number of water-soluble acid and direct dyes. Specific examples of anionic dyes include Direct Yellow 86, Acid Red 249, Direct Blue 199, Direct Black 168, Reactive Black 31, Direct Yellow 157, Reactive Yellow 37, Acid Yellow 23, Reactive Red 180, Acid Red 52, Acid Blue 9, Direct Red 227, Acid Yellow 17, Direct Blue 86, Reactive Red 4, Reactive Red 56, Reactive Red 31, and Direct Yellow 132; Aminyl Brilliant Red F-B (Sumitomo Chemical Co.); the Duasyn line of "salt-free" dyes available from Hoechst; mixtures thereof; and the like. Further examples include Bernacid Red 2BMN, Pontamine Brilliant Bond Blue A, BASF X-34, Pontamine, Food Black 2, Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Cartasol Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; Pro-Jet 485 (a copper phthalocyanine); Magenta 377; mixtures thereof, and the like. This list is intended to be merely exemplary, and should not be considered limiting.

A film promoting additive for use in the ink-jet ink should be selected to cause a decrease in the film forming temperature of the latex. In general, the decrease in the film forming temperature due to the film promoting additive can be related to the total amount of film promoting additive present in the ink-jet ink, and/or the amount of ink-jet ink applied to a print medium. Therefore, by increasing the total wt % of the film promoting additive, the film forming temperature of the latex can be lowered without the need for applying greater amounts of ink to the latex layer of the print medium. Alternatively, a greater amount of ink that contains a film promoting additive can be applied to a print medium to lower the film forming temperature of the discontinuous latex film. It should be noted that any additive known to one skilled in the art that causes a decrease in the film forming temperature the latex may be included within the scope of the present invention.

Film promoting additives that can lower the film forming temperature of the latex can include diols and glycols. Specific diols can include, without limitation: 1,2-hexanediol; 1,6-hexanediol; tetramethyl-5-decyne-4,7-diol2,4,7,9; ethoxylated 2,4,7,9-tetramethyl-5-decyn-4,7-diol; tetramethyl-5-decyne-4.7-diol-2,4,7,9; 2,2,4-trimethyl-1,3-pentanediol monoisobutyrate; and combinations thereof.

Specific glycols can include, without limitation: ethylene glycol; ethylene glycol n-butyl ether; ethylene glycol phenyl ether; diethylene glycol n-butyl ether; diethylene glycol methyl ether; propylene glycol methyl ether; propylene glycol methyl ether acetate; propylene glycol n-propyl ether; propylene glycol n-butyl ether; propylene glycol phenyl ether; dipropylene glycol methyl ether; dipropylene glycol methyl ether acetate; dipropylene glycol n-propyl ether; dipropylene glycol n-butyl ether; dipropylene glycol dimethyl ether; tripropylene glycol methyl ether; tripropylene glycol n-propyl ether; tripropylene glycol n-butyl ether; and combinations thereof.

Other film promoting additives that can decrease the film forming temperature of a latex include, but are not limited to: trimethylol propane and poly(oxo-1,2-ethandiyl).

Heat Sealing

After printing with ink-jet ink, heat is applied to the printed image to form a continuous film from the ink-associated latex regions. It is contemplated that the heat can be applied by any means known to one skilled in the art, including, but not limited to, heat that is directly applied via rollers, convective heat, or radiant heat. The heating step may be applied while the paper is in the printer via a printer-attached heating mechanism, or after printing via a separate device such as a laminator.

Heat is applied sufficient to seal the ink-associated areas while minimizing the required heating time of the printed media, thus allowing the non-printed latex regions to remain relatively unsealed. The amount of heat required to seal the ink-associated latex regions can vary depending on the particular latex/film promoting additive combination and the amount of film promoting additive in association with the latex layer. Additionally, as mentioned, a time and pressure component can also contribute to the formation of the continuous film at the ink-associated areas, as would be ascertainable by one skilled in the art after considering the present disclosure.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what are presently deemed to be the most practical and preferred embodiments of the invention. Also, each additive of these examples is described in accordance with its solids content by weight.

Example 1

Preparation of a Porous Coating Composition

A silica-based porous coating composition in accordance with embodiments of the present invention is prepared by dispersing in water the following: 80 wt % of silica, 15 wt % of polyvinyl alcohol, 2 wt % surfactant, and 3 wt % of glycerin.

Example 2

Preparation of Aqueous Top Coating Composition

An aqueous coating composition in accordance with embodiments of the present invention is prepared by admixing 90 wt % of acrylic latex particulates and 10 wt % of 4% polyvinyl alcohol. The acrylic latex particulates are cationic, about 150 nm in size, and have a glass transition temperature of 60° C. The polyvinyl alcohol is 88% hydrolyzed and has a viscosity of 8 cps.

Example 3

Application of Base Coating and Top Coating Compositions to Media Substrate The silica-based porous coating composition of Example 1 is applied to photobase using a Meyer rod at a delivery rate of 25 g/m². The porous coating composition is dried in an oven at 60° C. for 10 min to form a porous ink-receiving layer. The porous ink-receiving layer is coated with the aqueous top coating composition of Example 2 using a Meyer rod at a delivery rate of 4 g/m². The resulting print medium is then dried for 5 min at 45° C.

Example 4

Preparation of Test Prints

A diagnostic image is prepared using ink containing a yellow dye, by ink-jetting a colored strip of ink onto the print medium of Example 3. The colored strip is printed so that the optical density of the ink increases gradually from 0% to 100% along the strip. An HP DeskJet 5050 printer is used to prepare the colored strip. The ink comprises an ink vehicle including 2-pyrrolidone, 1,6-hexanediol, Dowfax 2A1, Surfynol CT-111, Zonyl FSA, and water.

Example 5

Heat Sealing the Print Media

The print medium of Example 4 is then processed though a laminator. Sealing of the latex layer is provided by a combination of heat, time, and pressure. The laminator is configured such that the temperature of the rollers is 120° C., the feed rate of the print media is 3 ft/min, and the pressure exerted by the rollers is 40 psi. At these settings, the print medium reaches a temperature of approximately 95° C.

Example 6

Print Test Results

A blue highlighter is drawn across the length of the latex layer over the colored strip of Example 4, from the 0% optical density end to the 100% optical density end. An attempt is then made to physically rub the highlighter dye off of the latex layer. The highlighter dye will rub off completely in those areas where a continuous film has been formed. The highlighter dye will still be visible where the latex layer is discontinuous, because the highlighter dye has been received by the ink-receiving layer beneath the latex layer. In this Example, the highlighter dye is visible against the yellow dye from the 0% optical density end up to approximately 79% optical density. This test allows the quantification of the amount of film promoting additive required to allow continuous film formation at a given temperature, i.e. at what optical density of ink the continuous film forms.

Example 7

Print Test Results with Various Color Dyes

Media are constructed, printed on using dyes of various colors, heated, and marked with a blue highlighter as in Examples 1-6. Measurements are then taken to determine at what optical density the highlighter dye is no longer visible against each ink, thus indicating an approximation of the optical density for that ink where complete sealing of the latex layer has occurred. Results of this experiment are found in Table 1.

TABLE 1

|  | Color of Ink | | | | |
| --- | --- | --- | --- | --- | --- |
|  | Yellow | Magenta | Cyan | Brown | Orange |
| Optical Density | 79% | 71% | 59% | 75% | 73% |

As can be seen by Examples 6 and 7, by increasing the density of the applied ink (and thus increasing the total amount of film promoting additive), the film-forming temperature is reduced, thereby allowing for a continuous film to form at certain locations, and not forming at other locations, i.e. unprinted areas and areas where not enough film promoting additive is applied to reduce the film forming temperature with respect to the specific temperature, pressure, and time system tested.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. A printed image on a print medium, comprising:
   a) a media substrate;
   b) a porous ink-receiving layer coated on the media substrate, said porous ink-receiving layer including semi-metal oxide or metal oxide particulates;
   c) a latex layer coated on the porous ink-receiving layer, wherein the latex layer includes latex particulates having a glass transition temperature from about 50° C. to about 120° C.; and
   d) an ink-jet ink comprising a film promoting additive printed on at least a portion of the latex layer forming ink-associated regions of the latex layer exclusive of non-printed latex regions, said ink-jet ink being received at least partially by the porous ink-receiving layer, wherein at least a portion of the ink-associated regions of the latex layer include a continuous film and the non-printed latex regions of the latex layer do not include a continuous film.

2. A printed image as in claim 1, wherein the latex layer further includes a binder.

3. A printed image as in claim 2, wherein the binder is present at less than about 20 wt %.

4. A printed image as in claim 3, wherein the binder is present at from about 5 wt % to about 15 wt %.

5. A printed image as in claim 2, wherein the binder includes a member selected from the group consisting of polyvinyl alcohol; water-soluble copolymers of polyvinyl alcohol; polyvinyl acetate; polyvinyl pyrrolidone; modified starches; water soluble cellulose derivatives; polyacrylamides; casein; gelatin; soybean protein; silyl-modified polyvinyl alcohol; conjugated diene copolymer latexes; acrylic polymer latexes; vinyl polymer latexes; functional group-modified latexes; aqueous binders of thermosetting resins; synthetic resin; and combinations thereof.

6. A printed image as in claim 5, wherein the binder includes polyvinyl alcohol.

7. A printed image as in claim 1, wherein the film promoting additive is a diol.

8. A printed image as in claim 7, wherein the diol is selected from the group consisting of: 1,2-hexanediol; 1,6-hexanediol; tetramethyl-5-decyne-4,7-diol2,4,7,9; ethoxylated 2,4,7,9-tetramethyl-5-decyn-4,7-diol; tetramethyl-5-decyne-4.7-diol-2,4,7,9; 2,2,4-trimethyl-1,3-pentanediol monoisobutyrate; and combinations thereof.

9. A printed image as in claim 8, wherein the diol is 1,6-hexanediol.

10. A printed image as in claim 1, wherein the film promoting additive is a glycol.

11. A printed image as in claim 10, wherein the glycol is selected from the group consisting of: ethylene glycol; ethylene glycol n-butyl ether; ethylene glycol phenyl ether; diethylene glycol n-butyl ether; diethylene glycol methyl ether; propylene glycol methyl ether; propylene glycol methyl ether acetate; propylene glycol n-propyl ether; propylene glycol n-butyl ether; propylene glycol phenyl ether; dipropylene glycol methyl ether; dipropylene glycol methyl ether acetate; dipropylene glycol n-propyl ether; dipropylene glycol n-butyl ether; dipropylene glycol dimethyl ether; tripropylene glycol methyl ether; tripropylene glycol n-propyl ether; tripropylene glycol n-butyl ether; and combinations thereof.

12. A printed image as in claim 10, wherein the glycol is 1,6-hexanediol.

13. A printed image as in claim 1, wherein the film promoting additive is trimethylol propane.

14. A printed image as in claim 1, wherein the latex layer has an average thickness from about 0.5 g/m$^2$ to about 10 g/m$^2$.

15. A printed image as in claim 14, wherein the latex layer has an average thickness from about 1 g/m$^2$ to about 5 g/m$^2$.

16. A method of producing the printed image of claim 1, comprising steps of:
    a) coating a media substrate with a porous coating composition to form a porous ink receiving layer, said porous coating composition including semi-metal oxide or metal oxide particulates;
    b) coating the porous ink-receiving layer with a latex layer including latex particulates, wherein the latex layer is configured to allow an ink-jet ink to be received at the porous ink-receiving layer, and wherein the latex particulates have a film forming temperature;
    c) printing ink-jet ink on at least a portion of the latex layer to form ink-associated latex regions exclusive of non-printed latex regions, wherein the ink is received at least partially by the ink-receiving layer, said ink-jet ink comprising:
       i) an ink vehicle;
       ii) a colorant; and
       iii) a film promoting additive, wherein the film promoting additive lowers the film forming temperature of the latex particulates in the ink-associated latex regions; and
    d) heating the latex layer such that the ink-associated latex regions form a continuous film, and non-printed latex regions do not form a continuous film.

17. A method as in claim 16, wherein the latex layer further includes a binder.

18. A method as in claim 17, wherein the binder is present at less than about 20 wt %.

19. A method as in claim 18, wherein the binder is present at from about 5 wt % to about 15 wt %.

20. A method as in claim 17, wherein the binder includes a member selected from the group consisting of polyvinyl alcohol; water-soluble copolymers of polyvinyl alcohol; polyvinyl acetate; polyvinyl pyrrolidone; modified starches; water soluble cellulose derivatives; polyacrylamides; casein; gelatin; soybean protein; silyl-modified polyvinyl alcohol; conjugated diene copolymer latexes; acrylic polymer latexes; vinyl polymer latexes; functional group-modified latexes; aqueous binders of thermosetting resins; synthetic resin; and combinations thereof.

21. A method as in claim 20, wherein the binder includes polyvinyl alcohol.

22. A method as in claim 16, wherein the film promoting additive is a diol.

23. A method as in claim 22, wherein the diol is selected from the group consisting of: 1,2-hexanediol; 1,6-hexanediol; tetramethyl-5-decyne-4,7-diol2,4,7,9; ethoxylated 2,4,7,9-tetramethyl-5-decyne-4,7-diol; tetramethyl-5-decyne-4.7-diol-2,4,7,9; 2,2,4-trimethyl-1,3-pentanediol monoisobutyrate; and combinations thereof.

24. A method as in claim 23, wherein the diol is 1,6-hexanediol.

25. A method as in claim 16, wherein the film promoting additive is a glycol.

26. A method as in claim 25, wherein the glycol is selected from the group consisting of: ethylene glycol; ethylene glycol n-butyl ether; ethylene glycol phenyl ether; diethylene glycol n-butyl ether; diethylene glycol methyl ether; propylene glycol methyl ether; propylene glycol methyl ether acetate; propylene glycol n-propyl ether; propylene glycol n-butyl ether; propylene glycol phenyl ether; dipropylene glycol methyl ether; dipropylene glycol methyl ether acetate; dipropylene glycol n-propyl ether; dipropylene glycol n-butyl ether; dipropylene glycol dimethyl ether; tripropylene glycol methyl ether; tripropylene glycol n-propyl ether; and combinations thereof.

27. A method as in claim 26, wherein the glycol is 1,6-hexanediol.

28. A method as in claim 16, wherein the film promoting additive is trimethylol propane.

29. A method as in claim 16, wherein the film promoting additive lowers the film forming temperature from about 3° C. to about 25° C.

30. A method as in claim 29, wherein the film promoting additive lowers the film forming temperature from about 5° C. to about 15° C.

31. A method as in claim 16, wherein the latex layer has an average thickness from about 0.5 g/m$^2$ to about 10 g/m$^2$.

32. A method as in claim 31, wherein the latex layer has an average thickness from about 1 g/m$^2$ to about 5 g/m$^2$.

33. A method as in claim 16, further comprising the step of printing on the non-printed latex regions after the heating step.

34. A printed image on a print medium, comprising:
   a) a media substrate;
   b) a porous ink-receiving layer coated on the media substrate, said porous ink-receiving layer including semimetal oxide or metal oxide particulates;
   c) a latex layer coated on the porous ink-receiving layer, where the latex layer includes latex particulates that function as a binder; and
   d) an ink-jet ink comprising a film promoting additive printed on at least a portion of the latex layer forming ink-associated regions of the latex layer exclusive of non-printed latex regions, said ink-jet ink being received at least partially by the porous ink-receiving layer, wherein at least a portion of the ink-associated regions of the latex layer include a continuous film and the non-printed latex regions of the latex layer do not include a continuous film,
   wherein the latex particulates in the non-printed latex regions comprise an inner portion with a higher glass transition temperature and an outer portion with a lower glass transition temperature, wherein the higher glass transition temperature and the lower glass transition temperature are configured such that when the latex is applied at an application temperature, the inner portion is non-tacky and the outer portion is tacky.

35. A printed image as in claim 34, wherein the film promoting additive is a diol.

36. A printed image as in claim 35, wherein the diol is selected from the group consisting of: 1,2-hexanediol; 1,6-hexanediol; tetramethyl-5-decyne-4,7-diol2,4,7,9; ethoxylated 2,4,7,9-tetramethyl-5-decyn-4,7-diol; tetramethyl-5-decyne-4.7-diol-2,4,7,9; 2,2,4-trimethyl-1,3-pentanediol monoisobutyrate; and combinations thereof.

37. A printed image as in claim 34, wherein the film promoting additive is a glycol.

38. A printed image as in claim 37, wherein the glycol is selected from the group consisting of: ethylene glycol; ethylene glycol n-butyl ether; ethylene glycol phenyl ether; diethylene glycol n-butyl ether; diethylene glycol methyl ether; propylene glycol methyl ether; propylene glycol methyl ether acetate; propylene glycol n-propyl ether; propylene glycol n-butyl ether; propylene glycol phenyl ether; dipropylene glycol methyl ether; dipropylene glycol methyl ether acetate; dipropylene glycol n-propyl ether; dipropylene glycol n-butyl ether; dipropylene glycol dimethyl ether; tripropylene glycol methyl ether; tripropylene glycol n-propyl ether; tripropylene glycol n-butyl ether; and combinations thereof.

39. A printed image as in claim 34, wherein the film promoting additive is trimethylol propane.

40. A printed image as in claim 34, wherein the latex layer has an average thickness from about 0.5 g/m$^2$ to about 10 g/m$^2$.

* * * * *

UNITED STATES PATENT AND TRADEMARK OFFICE
CERTIFICATE OF CORRECTION

PATENT NO. : 7,641,961 B2
APPLICATION NO. : 11/054127
DATED : January 5, 2010
INVENTOR(S) : Radha Sen et al.

It is certified that error appears in the above-identified patent and that said Letters Patent is hereby corrected as shown below:

In column 17, line 11, in Claim 26, before "and" insert -- tripropylene glycol n-butyl ether; --.

Signed and Sealed this

Twenty-ninth Day of June, 2010

David J. Kappos
*Director of the United States Patent and Trademark Office*